(12) United States Patent
Martin

(10) Patent No.: US 9,991,537 B2
(45) Date of Patent: Jun. 5, 2018

(54) REDOX SYSTEMS

(71) Applicant: University of Chester, Chester (GB)

(72) Inventor: Nathaniel Martin, Runcorn (GB)

(73) Assignee: University of Chester, Chester (GB)

( * ) Notice: Subject to any disclaimer, the term of this patent is extended or adjusted under 35 U.S.C. 154(b) by 0 days. days.

(21) Appl. No.: 14/889,667

(22) PCT Filed: May 2, 2014

(86) PCT No.: PCT/GB2014/051371
§ 371 (c)(1),
(2) Date: Nov. 6, 2015

(87) PCT Pub. No.: WO2014/181095
PCT Pub. Date: Nov. 13, 2014

(65) Prior Publication Data
US 2016/0126576 A1    May 5, 2016

(30) Foreign Application Priority Data
May 7, 2013 (GB) .................................. 1308178.1

(51) Int. Cl.
*H01M 8/08* (2016.01)
*H01M 8/20* (2006.01)
*H01M 8/18* (2006.01)
*C01G 39/00* (2006.01)

(52) U.S. Cl.
CPC ............ *H01M 8/08* (2013.01); *C01G 39/006* (2013.01); *H01M 8/188* (2013.01); *H01M 8/20* (2013.01); *H01M 2300/0005* (2013.01); *Y02E 60/528* (2013.01)

(58) Field of Classification Search
CPC .......... H01M 8/20; H01M 8/188; H01M 8/08; H01M 2300/0005; C01G 39/006; Y02E 60/528
See application file for complete search history.

(56) References Cited

U.S. PATENT DOCUMENTS

| 4,471,076 A * | 9/1984 | Blickle ..................... C08F 8/12 521/33 |
| 2009/0208809 A1* | 8/2009 | Hamrock ............ H01M 8/1023 429/492 |
| 2011/0048962 A1* | 3/2011 | Reece ....................... C25B 1/04 205/633 |
| 2011/0311879 A1* | 12/2011 | Yamada ................ H01M 4/366 429/303 |
| 2014/0004391 A1* | 1/2014 | Knuckey ............. H01M 4/9016 429/7 |
| 2015/0017494 A1* | 1/2015 | Amstutz ............... H01M 8/188 429/70 |

FOREIGN PATENT DOCUMENTS

WO    2009/040577 A    4/2009

OTHER PUBLICATIONS

Search Report dated Oct. 22, 2013 in corresponding application No. GB 1308178.1.
Ezzat et al., Polyoxometalate-based acid salts with tunable separation properties as recyclable Bronsted acid catalysts for the synthesis of B-keto enol ethers, Catalysis Communications 25 (2012) 64-68.
Limoges et al., Electrocatalyst Materials for Fuel Cells Based on the Polyoxometalates [PMo(12-n)VnO40](3+n)-(n=0-3), Electrochimica Acta, 2005, 50, 1169.

* cited by examiner

*Primary Examiner* — Muhammad S Siddiquee
(74) *Attorney, Agent, or Firm* — Knobbe, Martens, Olson & Bear, LLP

(57) ABSTRACT

A composition comprising a polyoxometalate and an additive tolerant to the properties of the polyoxometalate, wherein the properties of the polyoxometalate are maintained despite the presence of the additive, and wherein the additive is effective to reduce the freezing point and/or elevate the boiling point of the composition. Such a composition may be used in a fuel cell.

22 Claims, 6 Drawing Sheets

REDOX SYSTEMS

CROSS-REFERENCE TO RELATED APPLICATIONS

This application is the U.S. National Phase under 35. U.S.C. § 371 of International Application PCT/GB2014/051371, filed May 2, 2014, which claims priority to U.K. Application No. GB 1308178.1, filed May 7, 2013. The disclosures of the above-described applications are hereby incorporated by reference in their entirety.

FIELD OF THE INVENTION

The present invention relates to compositions comprising polyoxometalates and their uses including uses as redox-active materials and uses as catalysts. The invention relates in particular, though not exclusively, to compositions comprising polyoxometalate redox couples and fuel cells comprising the same.

BACKGROUND OF THE INVENTION

Polyoxometalates have many uses in a variety of applications, as disclosed in for example: "Pushing the frontiers in polyoxometalate and metal oxide cluster science", Dalton Transactions, 2012, Issue 33, 9799-10106; "Polyoxometalate complexes in organic oxidation chemistry", Neumann, R.; progress in inorganic chemistry 2007, volume 47, 317-370 and "Polyoxometalate chemistry: an old field with new dimensions in several disciplines", Pope, Michael T. and Müller, Achim, Angew. Chem. Int. Ed. Engl. 2003, 30, 34-48. In particular, their ability to act as oxidants as well as their potentially strongly acidic nature means that they have a variety of uses as chemical catalysts. Their thermal stability and reversible redox behaviour in the presence of oxygen renders them particularly useful.

Polyoxometalate ions contain transition metal oxyanions and other components linked together in a framework. Various types of polyoxometalates are known. Some of the most common, and useful, structures are based on the Keggin structure and variations thereof, as disclosed in the above-mentioned documents. Nevertheless other polyoxometalate forms are possible and encompassed within the present invention.

A particular focus of the present invention is the use of polyoxometalates as redox-active materials within redox systems. A redox-active material is a species which can oxidize or reduce other species thereby itself being reduced or oxidized. A redox couple is the reduced and oxidized form of the same species. Under appropriate external oxidizing and reducing conditions the species can cycle between its reduced and oxidized forms.

Redox couples and redox cycles are useful in several fields. One reason for this is that they facilitate the indirect reaction of a reducing agent with an oxidizing agent by cycling and regeneration of the redox couple. Such indirect reaction can be desirable where physical separation is preferred or advantageous, and can be essential where the chemistry of the external reducing and oxidizing agents is such that direct reaction would not be possible or efficient. The cycling and regeneration of the redox material means that it is not used up and can act as a catalyst.

In some redox cycles more than one redox couple may be involved and/or a mediator may be used in a further cycle. Thus, for example, an external oxidant may be reduced by the reduced form of a redox couple, and the resultant oxidized form of the redox couple may be subjected to external reducing conditions either directly or indirectly via a mediator.

One area where redox couples have found utility is indirect or redox fuel cells which have applications in microfuel cells for electronic and portable electronic components, and also in larger fuel cells for the automotive industry.

Fuel cells have been known for stationary applications such as back-up power and combined heat and power (CHP), as well as portable and remote power replacing a diesel gen-set, and automotive and portable electronics technology for very many years although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, air or oxygen as the oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it. It is this oxidised species that is fed to the cathode.

One type of redox couple which can be used in indirect or redox fuel cells is a polyoxometalate redox couple. Polyoxometalate (POM) redox couples can be used in catholytes, as disclosed for example in our patent publications WO 2007/110663, WO 2009/040577 and WO 2012/085542. The polyoxometalates accept electrons (i.e. are at least partially reduced) at the cathode, and subsequently the polyoxometalates are regenerated by reaction of the reduced polyoxometalate species with oxidant, typically oxygen.

The ability of polyoxometalates to reversibly accept electrons means that they are useful not just in indirect fuel cells, but also in a range of other catalytic processes. Polyoxometalate catalysts may for example be used as catalysts in synthetic organic chemistry. Furthermore some uses of polyoxometalates do not relate to catalytic properties but instead to other properties, for example other chemical, physical or structural properties.

Whilst polyoxometalates are very useful, they have their limitations, particularly in terms of the conditions under which they operate effectively.

BRIEF SUMMARY OF THE INVENTION

The present inventors have recognised various shortcomings of existing polyoxometalate systems.

From a first aspect the present invention provides a composition comprising a polyoxometalate and an additive tolerant to the properties of the polyoxometalate, wherein the properties of the polyoxometalate are maintained despite the presence of the additive, and wherein the additive is effective to reduce the freezing point and/or elevate the boiling point of the composition.

For example, with regard to the redox-active nature of the polyoxometalate material, the additive is tolerant to the oxidizing and/or reducing character of the polyoxometalate, and the redox activity of the polyoxometalate is maintained despite the presence of the additive, and furthermore the additive is effective to reduce the freezing point and/or elevate the boiling point of the composition.

Thus the present invention extends the liquid range of polyoxometalate systems so that they can be used under a greater range of conditions and in a greater range of applications. Some polyoxometalate systems are liquid only over a narrow temperature range but the present invention expands the usefulness of such compositions. The present invention allows operation at higher temperatures which in many cases results in increased reaction rates and greater reactivity. The present invention equally importantly allows reaction at lower temperatures than would be possible in the absence of the additive. This can allow greater selectivity. It is also useful where the ambient temperature is low; the use of the additive can mean that external heat input is not required or is minimized, which can result in significant cost savings and environmental benefits, and avoid technological and engineering complexity.

In accordance with the present invention the properties of the polyoxometalate are maintained at least partially, i.e. the composition still has the desired properties even if the additive has some adverse effect. Preferably the additive has no adverse effect on the properties of the polyoxometalate, i.e. the properties are substantially the same as if the additive were not present.

For example, the redox activity of the polyoxometalate material is maintained at least partially, i.e. the composition still has redox activity even if the additive has some adverse effect on the redox activity. Preferably the additive has no adverse effect on the redox chemistry, i.e. the redox activity is substantially the same as if the additive were not present.

Hitherto the skilled person has not appreciated the value of altering the liquid range of polyoxometalate systems in this way. In the fuel cell field, for example, the skilled person has not previously been motivated to alter the liquid range of catholytes used in PEM or similar fuel cells: the skilled person was already aware that PEM fuel cells have advantages compared to SOFCs and MCFCs, for example in that SOFCs and MCFCs function at high temperatures whereas PEM fuel cells function at acceptable moderate temperatures. We have now found that PEM and similar fuel cells can be further improved by using the compositions of the present invention.

A redox-active polyoxometalate material may be part of a redox couple and some applications rely on the cycling between both component species of the redox couple, and optionally on the redox couple providing catalysis. In such cases cycling activity and optionally catalytic activity are present despite the presence of the additive and preferably the additive has no adverse effect on the catalytic activity.

Polyoxometalate systems, particularly those which are commercially or industrially useful, often take the form of solutions or suspensions. In the present invention the compositions take the form of aqueous systems, e.g. aqueous solutions. Avoiding the use of organic solvents is cost-effective and environmentally friendly and reduces disposal and safety requirements. Polyoxometalate systems are based more on inorganic rather than organic structures, and/or ionic rather than covalent materials, with the consequence that water acts as a more suitable solvent and reaction medium than organic to solvents.

Polyoxometalate systems are reactive rather than inert: they have oxidising properties. They also usually exist in extremely acidic form. The present invention provides that the additive which affects the freezing and/or boiling point of the composition is tolerant of the $pK_a$ (and pH when in aqueous solution) and the inherent acidic nature of the polyoxometalate composition.

The present invention allows the use of an effective additive even where the polyoxometalate composition is for example very acidic, e.g. where the composition is an aqueous system having a pH of 3 or less e.g. a pH of 2 or less e.g. between −3 and 3, e.g. between −2 and 2 or between −1 and 2.

The additive is a solute which extends the liquid range of the polyoxometalate system according to colligative theory. Effectively, the solute dilutes the solvent, thereby inhibiting freezing and/or evaporation.

The additive may depress the freezing point, at standard pressure, of the composition, by at least about 1, 2, 5, 10, 20, 30, 40 or 50° C.

The additive may elevate the boiling point, at standard pressure, of the composition, by at least about 1, 2, 5, 10, 20, 30, 40 or 50° C.

Polyoxometalates

In accordance with the present invention the composition may comprise any polyoxometalate or aqueous polyoxometalate system. Optionally the polyoxometalate may be of the Keggin form.

Optionally the polyoxometalate is in aqueous solution at a concentration of at least about 0.075M.

Optionally the polyoxometalate structure may be as disclosed in our earlier patent publications WO 2007/110663, WO 2009/040577 or WO 2012/085542.

Optionally the polyoxometalate is selected from one or more of the following groups, which are effective redox materials, for example in catholytes for fuel cells.

Polyoxometalate Group A

The polyoxometalate may be represented by the formula:

$$X_a[Z_bM_cO_d]$$

wherein:
X is selected from hydrogen, alkali metals, alkaline earth metals, ammonium or alkyl ammonium and combinations of two or more thereof;
Z is selected from B, P, S, As, Si, Ge, Ni, Rh, Sn, Al, Cu, I, Br, F, Fe, Co, Cr, Zn, $H_2$, Te, Mn and Se and combinations of two or more thereof;
M is a metal selected from Mo, W, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series, and combinations of two or more thereof;
a is a number of X necessary to charge balance the $[Z_bM_cO_d]$ anion;
b is from 0 to 20,
c is from 1 to 40; and
d is from 1 to 180.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

Vanadium and molybdenum, and combinations thereof, are particularly preferred for M.

Phosphorus is particularly preferred for Z.

A combination of hydrogen and an alkali metal and/or alkaline earth metal is particularly preferred for X. One such preferred combination is hydrogen and sodium.

Specific examples of polyoxometalates include molybdophosphoric acid, $H_3PMo_{12}O_{40}$ and molybdovanadophosphoric acid, $H_5PMo_{10}V_2O_{40}$.

In a preferred embodiment of the present invention, the polyoxometalate comprises vanadium, more preferably vanadium and molybdenum. Preferably the polyoxometalate comprises from 2 to 4 vanadium centres.

Thus, particularly preferred polyoxometalates include $H_3Na_2PMo_{10}V_2O_{40}$, $H_3Na_3PMo_9V_3O_{40}$, or $H_3Na_4PMo_8V_4O_{40}$, and compounds of intermediate composition. In addition, a mixture of these or other polyoxometalate catalysts is also envisaged. For this embodiment, preferably, at least one X is hydrogen. However, it is also preferred that not all X be hydrogen. More preferably, at least two of X are not hydrogen. X comprising at least one hydrogen and at least one other material selected from alkali metals, alkaline earth metals, ammonium and combinations of two or more thereof is preferred.

The concentration of the polyoxometalate in solution is preferably at least about 0.08M, more preferably at least about 0.1M, still more preferably at least about 0.125M and most preferably at least about 0.15M.

Polyoxometalate Group B

The counterions of the polyoxometalate may comprise at least one divalent ion.

The or each divalent ion is preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of two or more thereof.

The polyoxometalate and associated counterion may be represented by the formula:

$$X_a[Z_bM_cO_d]$$

wherein:
X is selected from hydrogen, alkali metals, alkaline earth metals, ammonium, transition metal ions and combinations of two or more thereof, but wherein at least one X is a divalent ion;
Z is selected from B, P, S, As, Si, Ge, Ni, Rh, Sn, Al, Cu, I, Br, F, Fe, Co, Cr, Zn, $H_2$, Te, Mn and Se and combinations of two or more thereof;
M is a metal selected from Mo, W, V, Nb, Ta, Mn, Fe, Co, Cr, Ni, Zn Rh, Ru, Tl, Al, Ga, In and other metals selected from the 1st, 2nd and 3rd transition metal series and the lanthanide series, and combinations of two or more thereof;
a is a number of X necessary to charge balance the $[M_cO_d]$ anion;
b is from 0 to 20;
c is from 1 to 40; and
d is from 1 to 180.

At least one X is preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of two or more thereof.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

Vanadium and molybdenum, and combinations thereof, are particularly preferred for M.

Phosphorus is particularly preferred for Z.

A combination of hydrogen and an alkali metal and/or alkaline earth metal is particularly preferred for X, provided that at least one X is one or more divalent ions. One such preferred combination is hydrogen and sodium with one or more divalent ions. In each case the or each divalent ion is preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of two or more thereof.

Specific examples of polyoxometalates include molybdophosphoric acid, $H_3PMo_{12}O_{40}$ and molybdovanadophosphoric acid, $H_5PMo_{10}V_2O_{40}$, wherein the protons are at least partially replaced by one or more divalent ions, preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of two or more thereof.

In a preferred embodiment of the present invention, the polyoxometalate comprises vanadium, more preferably vanadium and molybdenum.

Preferably the polyoxometalate comprises from 2 to 4 vanadium centres. Thus, particularly preferred polyoxometalates include $H_3Na_2PMo_{10}V_2O_{40}$, $H_3Na_3PMo_9V_3O_{40}$, or $H_3Na_4PMo_8V_4O_{40}$, wherein sodium ions are at least partially replaced by one or more divalent ions, and compounds of intermediate composition. In addition, a mixture of these or other polyoxometalate catalysts is also envisaged. For this embodiment, preferably, at least one X is hydrogen. However, it is also preferred that not all X be hydrogen. More preferably, at least two of X are not hydrogen. X comprising at least one hydrogen and at least one other material selected from alkali metals, alkaline earth metals, ammonium and combinations of two or more thereof is preferred, provided that at least one X is one or more divalent ions, preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of to two or more thereof.

The concentration of the polyoxometalate in solution is preferably at least about 0.08M, more preferably at least about 0.1M, still more preferably at least about 0.125M and most preferably at least about 0.15M.

Polyoxometalate Group C

The polyoxometalate may be represented by the formula:

$$X_a[Z_bM_cO_d]$$

wherein:
X is selected from hydrogen, alkali metals, alkaline earth metals, ammonium or alkyl ammonium and combinations of two or more thereof;
Z is selected from B, P, S, As, Si, Ge, Ni, Rh, Sn, Al, Cu, I, Br, F, Fe, Co, Cr, Zn, $H_2$, Te, Mn and Se and combinations of two or more thereof;
M comprises at least one V atom, and M is a metal selected from Mo, W, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series and combinations of two or more thereof;
a is a number of X necessary to charge balance the $[Z_bM_cO_d]$ anion;
b is from 0 to 20;

c is from 1 to 40; and
d is from 1 to 180.

The composition may optionally comprise not only a polyoxometalate of this group (Group C) but also a vanadium (IV) compound.

The composition is an aqueous based solution.

Preferred polyoxometalate compounds have a Keggin structure with general formula $X_a[Z_1M_{12}O_{40}]$.

Preferred metals for M are molybdenum, tungsten and vanadium and combinations of two or more of these, provided that the polyoxometalate must have at least one of M being vanadium. Preferably 2-5 of M are vanadium, more preferably 3 or 4, and most preferably 4.

The remaining M is preferably either molybdenum or tungsten or a combination of both.

Phosphorous is particularly preferred for Z.

X is preferably selected from hydrogen, alkali metals, alkaline earth metals, ammonium or alkyl ammonium and combinations of two or more thereof. Particularly preferred examples include hydrogen, sodium, lithium and combinations thereof.

Specific non-limiting examples of compositions of the present invention comprise $H_{3+e}PMo_{12-e}V_eO_{40}$ and $H_{3+e}PW_{12-e}V_eO_{40}$, where e=2-5; $H_fX_gPMo_{12-e}V_eO_{40}$, $H_fX_gW_{12-e}V_eO_{40}$ where e=2-5, f+g=3+e and X=Na, Li or combinations thereof.

The concentration of the polyoxometalate in the composition is preferably at least about 0.1M, more preferably at least about 0.15M and most preferably at least about 0.20M.

Also included as part of the composition is a vanadium (IV) compound. Any vanadium (IV) containing compound can be used but specific examples include $VO_2$, $V_2O_4$, $VOSO_4$, $VO(acac)_2$, $VO(ClO_4)_2$, $VO(BF_4)_2$, and hydrated versions of these materials. Particularly preferred examples are $VO_2$, $V_2O_4$ and $VOSO_4 \cdot xH_2O$.

Preferably the concentration of the vanadium (IV) compound is at least about 0.05M or at least about 0.1M or at least about 0.15M or at least about 0.2M or at least about 0.25M or at least about 0.3M.

Preferably the molar ratio between the polyoxometalate and the vanadium (IV) compound is at least about 1:10 or at least about 1.5:10 or at least about 2:10 or at least about 2.5:10 or at least about 3:10.

Particularly preferred combinations include $H_{3+e}PMo_{12-e}V_eO_{40}$ or $H_{3+e}PW_{12-e}V_eO_{40}$ where e=2-5 with added $V_2O_4$, and $H_fX_gPMo_{12-e}V_eO_{40}$ or $H_fX_gPW_{12-e}V_eO_{40}$ where e=2-5, f+g=3+e and X=Na, Li or combinations thereof with added $VOSO_4$.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

A combination of hydrogen and an alkali metal and/or alkaline earth metal is particularly preferred for X. One such preferred combination is hydrogen and sodium.

In a preferred embodiment of the present invention, the polyoxometalate comprises vanadium, more preferably vanadium and molybdenum. Preferably the polyoxometalate comprises from 2 to 4 vanadium centres. Thus, particularly preferred polyoxometalates include $H_3Na_2PMo_{10}V_2O_{40}$, $H_3Na_3PMo_9V_3O_{40}$, or $H_3Na_4PMo_8V_4O_{40}$, and compounds of intermediate composition. In addition, a mixture of these or other polyoxometalate catalysts is also envisaged. Preferably at least one X is hydrogen, and in some embodiments all X will be hydrogen. However, in some cases it may be preferred that not all X be hydrogen, for example in that case that at least two of X are not hydrogen. For example in that case, X may comprise at least one hydrogen and at least one other material selected from alkali metals, alkaline earth metals, ammonium and combinations of two or more thereof.

Polyoxometalate Group D

Optionally the polyoxometalate may be represented by the formula:

$$X_a[Z_bM_cO_d]$$

wherein:

X is selected from hydrogen, alkali metals, alkaline earth metals, ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M comprises W and optionally one or more of Mo, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series;

a is a number of X necessary to charge balance the $[Z_bM_cO_d]^{a-}$ anion;

b is from 0 to 5;

c is from 5 to 30; and d is from 1 to 180.

It is to be understood that such formulae used herein are generic formulae and that a distribution of related species may exist in solution.

Preferred ranges for b are from 0 to 5, more preferably 0 to 2.

Preferred ranges for c are from 5 to 30, preferably from 10 to 18 and most preferably 12.

Preferred ranges for d are from 1 to 180, preferably from 30 to 70, more preferably 34 to 62 and most preferably 34 to 40.

The polyoxometalate of the present invention preferably contains from 1 to 6 vanadium centres. Example formulae therefore include $X_a[Z_1W_{12-x}V_xO_{40}]$ where x=1 to 6. In one embodiment of the present invention, the polyoxometalate has the formula $X_a[Z_1W_9V_3O_{40}]$. In another embodiment, the polyoxometalate has the formula $X_a[Z_1W_{11}V_1O_{40}]$.

B, P, S, As, Si, Ge, Al, Co, Mn or Se are particularly preferred for Z, with P, S, Si, Al or Co being most preferred. The successful use of such a range of atoms would not be possible with a polyoxometalate that contains, for example, molybdenum, as outlined in the prior art. In particular, the use of silicon and aluminium in combination with tungsten in the polyoxometalates of the present invention has surprisingly been shown to significantly improve the performance of the fuel cells. For example, tungsten polyoxometalates with aluminium or silicon demonstrate more reversible electrochemical properties at a higher potential compared to the polyoxometalates commonly found in the prior art.

M preferably consists of 1 to 3 different elements. In one embodiment, M is a combination of tungsten, vanadium and/or molybdenum. The polyoxometalate may be absent of molybdenum, and further may be absent of any metals other than tungsten or vanadium. The polyoxometalate may alternatively consist of tungsten. M preferably includes more than two, more than four or more than six tungsten atoms.

Hydrogen, or a combination of hydrogen and an alkali metal and/or alkaline earth metal are particularly preferred examples for X. X preferably comprises a hydrogen ion or a combination of a hydrogen ion and an alkali metal ion, and more preferably comprises one or more of $H^+$, $Na^+$, $K^+$ or $Li^+$. Preferred combinations include hydrogen, hydrogen with sodium and hydrogen with potassium.

In a preferred embodiment, the polyoxometalate may be $H_6[AlW_{11}V_1O_{40}]$. Alternatively the polyoxometalate may be $X_7[SiW_9V_3O_{40}]$ where, as an example, X can give rise to the general formula $K_2H_5[SiW_9V_3O_{40}]$. Further, a mixture of these or other polyoxometalate catalysts is also envisaged.

The concentration of the polyoxometalate in solution may optionally be between 0.01 M and 0.6M. If the polyoxometalate of the present invention is the major constituent of the solution, a concentration range of 0.1 M-0.6M is preferred, whilst 0.15M-0.4M is most preferred.

Additives

The additive may be any suitable additive which extends the liquid range of the composition.

Preferably the additive, or the in situ dissociation product(s) of the additive, has a molecular weight of 400 or less, 300 or less, 250 or less, or 200 or less, e.g. of 175 or less, or 150 or less. This is advantageous because the colligative effects are dependent on the molality of the additive and therefore a low mass of a low molecular weight additive can result in a significant extension of liquid range.

Preferably the additive is present in the composition at a concentration effective to extend the liquid range of the system in a desired manner. For example concentrations of from 0.05M to 5M may be contemplated. The additive is preferably present in an amount effective to reduce the freezing point and/or elevate the boiling point of the composition. The freezing point may be reduced by 1, 10, 20, 30, 40 or 50° C. compared to the freezing point of the composition in the absence of the additive. The boiling point may be elevated by the same amount, or optionally by a reduced amount, when compared to the degree of freeze point reduction.

Preferably the additive is significantly or fully dissociated in the composition, because the effect on the colligative properties increases as the extent of dissociation increases.

Many polyoxometalate materials are highly acidic. Preferably the additive is more acidic than the polyoxometalate material or the solution comprising the polyoxometalate material. Preferably the additive has a pKa of 4 or lower, preferably 3 or lower, or 2 or lower, or 1 or lower or 0 or lower.

Where the polyoxometalate acts as an oxidant, preferably the additive is already fully oxidized so that it can withstand the oxidizing conditions of the composition. Alternatively, or as well, the oxidation potential of the additive is lower than that of the polyoxometalate in the composition.

The additive is preferably ionic in character so that for a given molality of additive a higher number of ions is released into solution in operation of the additive.

The additive may be, or may comprise, one or more acid, or salt or derivative thereof, wherein the acid is a carboxylic acid or a sulphonic acid, optionally in combination with one or more alternative acidic materials such as phosphoric acid.

Preferably the acid is a sulphonic acid, or salt or derivative thereof.

The effectiveness of using sulphonic acids or derivatives in combination with polyoxometalates can be contrasted with other systems. Many components which might be assumed to be effective are not actually suitable additives. For example, antifreeze agents or freezing point lowering chemicals are known in other fields, but many have an unacceptable impact on performance in the context of the present invention.

Sulphonic acids are highly acidic and fully dissociated even at the very low pH of polyoxometalate solutions. Their high level of dissociation means that they are very effective in altering the colligative properties of the polyoxometalate solutions. Unlike many materials their high level of acidity means that they are compatible with polyoxometalate solutions. They are also highly oxidized and therefore resistant to the oxidizing properties of polyoxometalates.

We have found that sulphonic acids and their salts do not disturb the polyoxometalate activity and chemistry. Some other chemicals can lead to the breakdown of the polyoxometalate ions, precipitation, or reaction, all of which can mean that the polyoxometalates are no longer effective. For example, glycerol reacts with the polyoxometalate, and sodium chloride and some other inorganic salts—when added at the levels required to produce significant freezing point depression—result in precipitation.

In one preference, the sulphonic acid is a halogenated sulphonic acid.

In one preference, the sulfonic acid is methanesulphonic acid.

When the additive is a salt, suitable cations present in the ionic additive include alkali and alkaline earth metals, transition metal oxides and organic cations. Amongst transition metal oxides, vanadium oxides such as $VO^{2+}$, $V_2O_5^+$ and combinations thereof are preferred because they may provide ancillary redox benefits in the system. Relatively low molecular weight alkaline and alkaline earth metals are also particularly suitable.

Applications

The present invention relates to any composition comprising a polyoxometalate which, in application, may benefit from an extended liquid range. For example the composition may act as a redox system, catalyst or mediator.

The compositions of the present invention may be used as catalysts, for example in synthetic organic chemistry.

Some of the compositions, for example some of the polyoxometalate compositions, have uses which are not dependent on catalytic activity, but which still benefit from an extended liquid range.

One preferred application of the composition of the present invention is in fuel cells. In this context the polyoxometalate acts as a redox-active material. In particular, in accordance with the present invention it is preferred that a catholyte comprises the composition of the present invention.

For example the fuel cell may be an indirect or redox fuel cell comprising a non-volatile catholyte solution in fluid communication with the cathode, wherein the catholyte solution comprises a polyoxometalate redox couple being at least partially reduced at the cathode in operation of the cell, and at least partially regenerated by reaction with oxidant after such reduction at the cathode.

Suitable fuel cells may be PEM fuel cells or variants thereof, or selected from any fuel cell where a redox cycle (optionally in combination with other redox cycles or mediator cycles) can be used to indirectly bring about oxidation at the cathode.

Some suitable fuel cells and catholytes (before addition of the additive of the present invention) are disclosed in for example WO 2007/110663, WO 2009/040577 and WO 2012/085542.

The compositions of the present invention allow fuel cells to be used over a greater temperature range. In particular, the fuel cells can be used at lower temperatures than would normally be possible.

Preferred compositions outlined above are particularly effective in fuel cells. The use of sulphonic acids or their salts is particularly effective in polyoxometalate catholytes. Other additives, such as ethylene glycol, may adversely affect the performance of the cell.

Other preferred applications of the compositions of the present invention are in redox batteries and electrolysers.

BRIEF DESCRIPTION OF THE DRAWINGS

The present invention will now be described in further non-limiting detail and with reference to the Figures in which.

DETAILED DESCRIPTION OF THE INVENTION

Solutions containing methanesulphonic acid or its salts were made by dissolving the required amount of additive into 0.3M polyoxometalate (POM) solution and then adjusting the volume back to its original value by evaporating off the required volume of water.

Sodium methanesulfonate (SMS) and methanesulfonic acid were purchased from Sigma Aldrich and used as received. Lithium methanesulfonate (LMS) was made by neutralising methanesulfonic acid with LiOH and drying under vacuum.

The influence on solution freezing point of added lithium methane sulfonate (LMS) to 0.3M $H_7PO_{40}Mo_8V_4$ in aqueous solution (HV4) was as follows.

| LMS Concentration | Approximate $T_f$ |
|---|---|
| 2M | −19° C. |
| 3M | −31° C. |
| 4M | ≈−40° C. |
| 5M | <−50° C. |

The influence upon solution freezing point of addition of 1M and 2M sodium methanesulfonate (SMS) or lithium methanesulfonate (LMS) to 0.3 M $H_3Na_4PO_{40}Mo_8V_4$ (NaV4), 0.3M $H_7PO_{40}Mo_8V_4$ (HV4) and 0.3M $H_{10}P_2O_{44}Mo_8V_4$ (FC6) was as follows.

| Sodium Series | Freeze Point, ° C. | Lithium Series | Freeze Point, ° C. |
|---|---|---|---|
| 1M in NaV4 | −9.0 | 1M in NaV4 | −10.2 |
| 2M in NaV4 | −17.5 | 2M in NaV4 | −20.4 |
| 1M in HV4 | −10.2 | 1M in HV4 | −12.8 |
| 2M in HV4 | −19.3 | 2M in HV4 | −24.7 |
| 1M in FC6 | −10.5 | 1M in FC6 | −12.2 |
| 2M in FC6 | −21.0 | 2M in FC6 | −24.1 |

These values were measured by analysing their cooling curves and recording phase changes indicated by a change in cooling rate.

Figure 1:
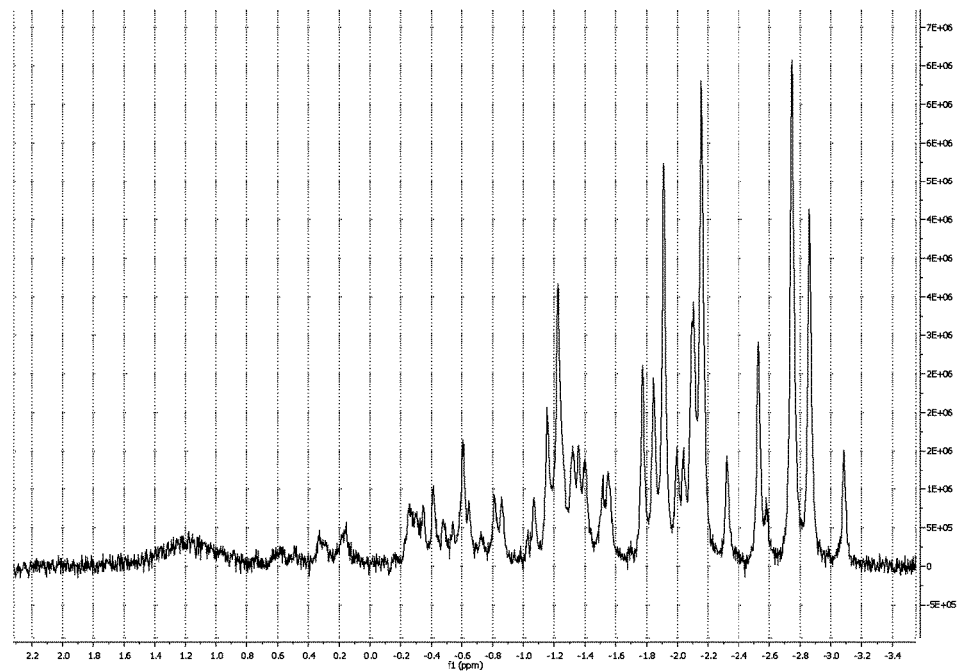
FIG. 1 shows P31 NMR spectra of a polyoxometalate system with an additive of the present invention.
Figure 2:
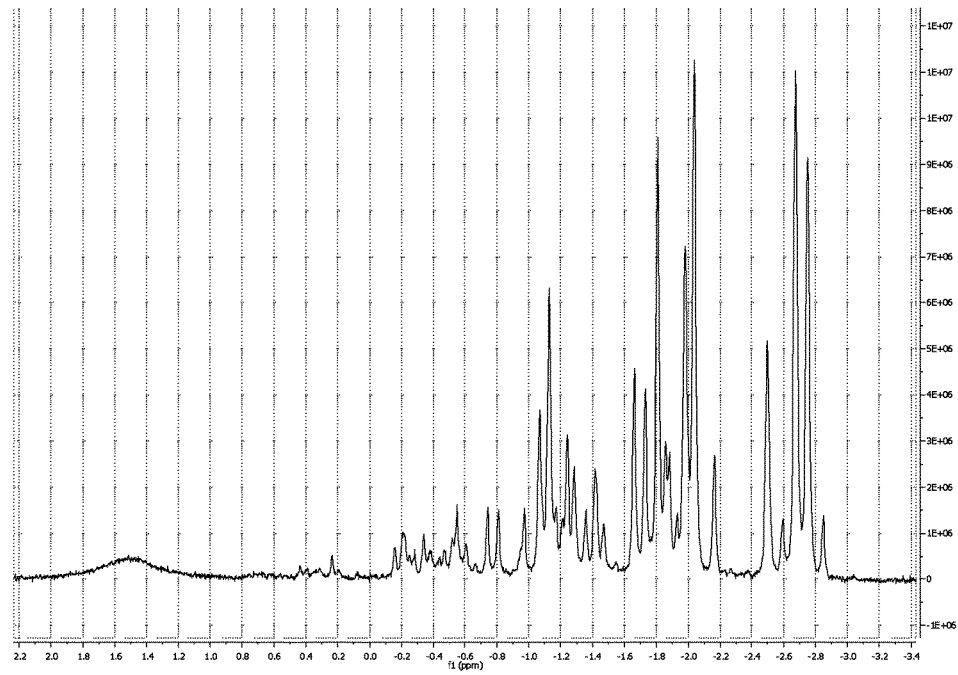
FIG. 2 shows P31 NMR spectra of a polyoxometalate system without an additive of the present invention.

Evidence of Keggin type structures still being present was provided by NMR analysis. The phosphorus 31 NMR spectrum was compared to that of standard HV4 and shown to be similar (see FIGS. 1 and 2), indicating that major speciation changes had not taken place.

Figure 3:
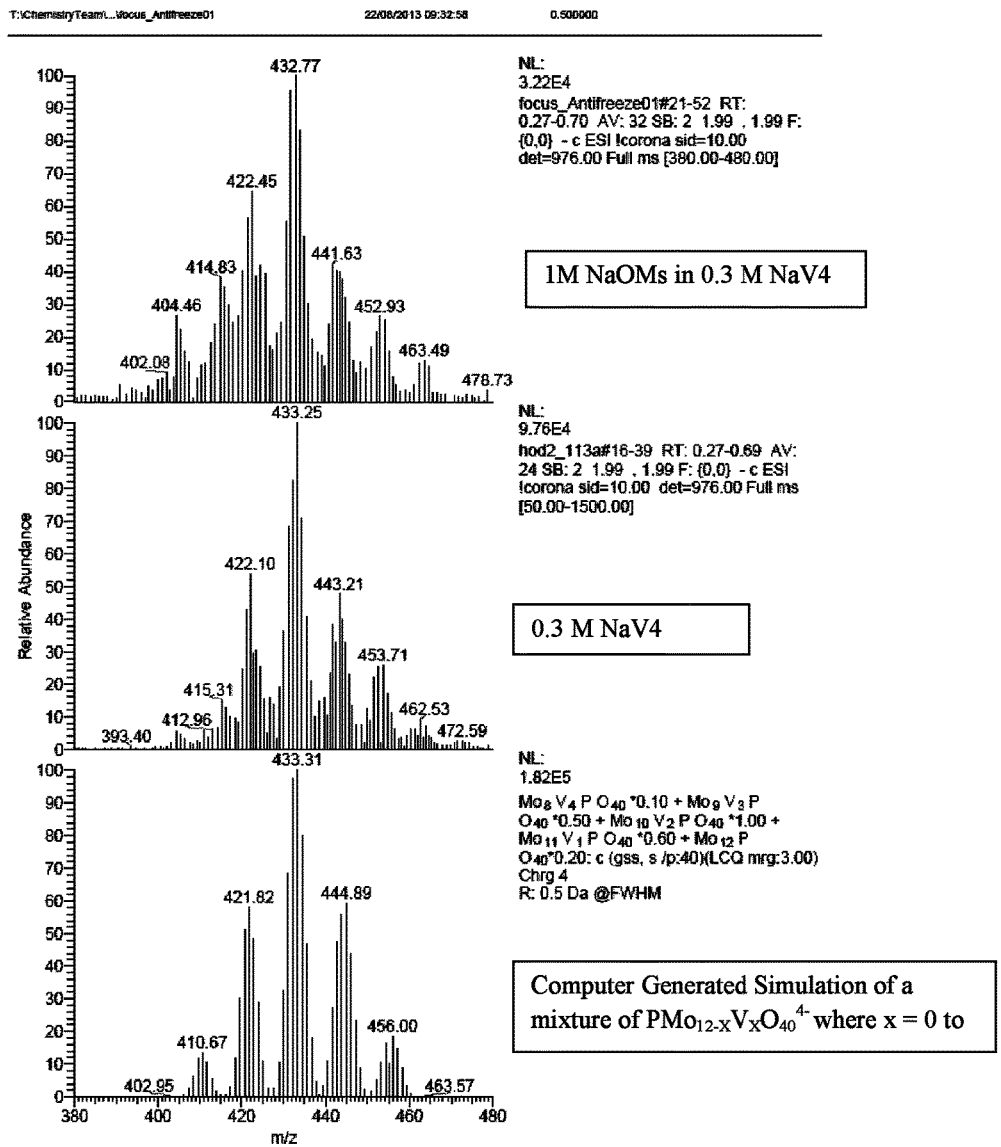
FIG. 3 shows a mass spectrometry comparison between a polyoxometalate system with and without an additive of the present invention, together with a computer generated simulation of an equivalent system showing the expected isotopic distribution for the POM in question.

Further evidence of Keggin structures still being present after treatment with antifreeze additives is given by the Mass Spectrometry data shown in FIG. 3. The electrospray mass spectra were recorded in the negative mode with a cone voltage of 10 eV and a probe temperature of 450° C., with ultrapure water as the eluent. The upper section of FIG. 3 shows the spectra recorded with the antifreeze additive which is similar to that of untreated POM solution (middle section) and similar to a computer generated simulation of the expected POM formula (lower section).

Figure 4:
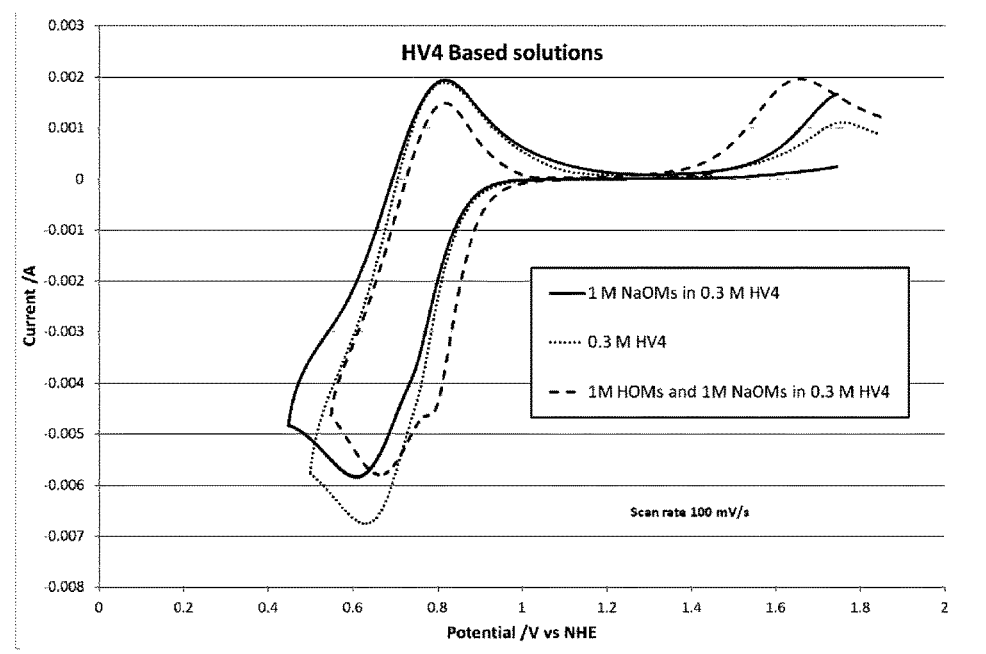
FIG. 4 shows a cyclic voltammogram of three polyoxometalate systems with, respectively, no additive, one additive and two additives of the present invention.

Cyclic Voltammetry carried out at 30° C. showed all the expected redox processes as shown in FIG. 4. This figure shows a comparison between HV4 and a solution of HV4 into which 1M NaOMs had been added and also a solution of HV4 into which 1M HOMs and 1M NaOMs had been added. Changes in solution pH, conductivity and viscosity account for the observed differences. However, major changes in the redox behaviour of the POM system were not observed.

Figure 5:
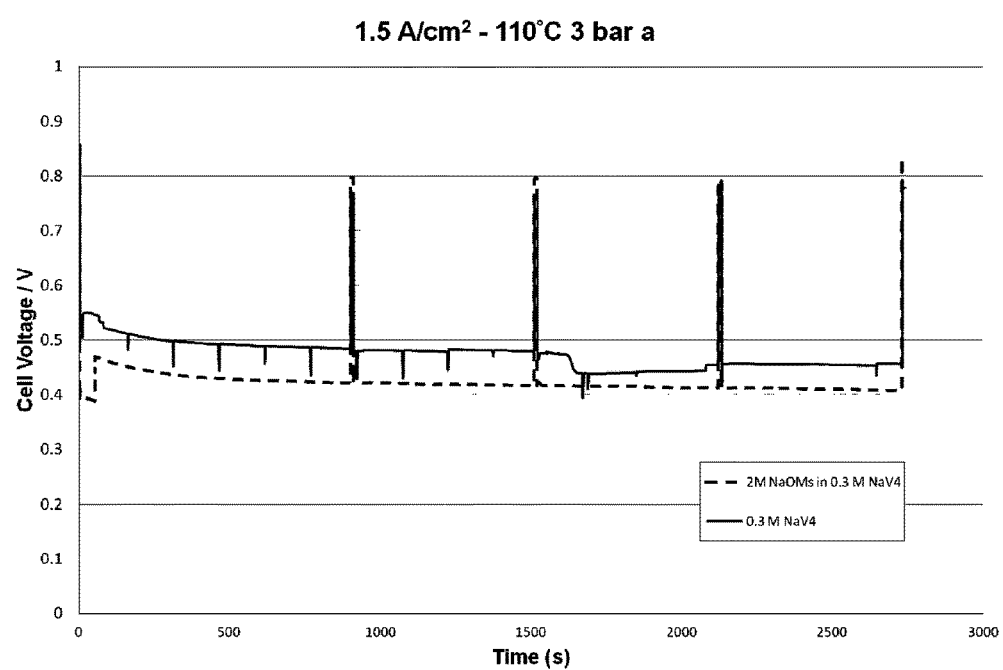
FIG. 5 shows a steady state comparison at 1.5 A/cm$^2$ between a polyoxometalate system with and without an additive of the present invention.
Figure 6:
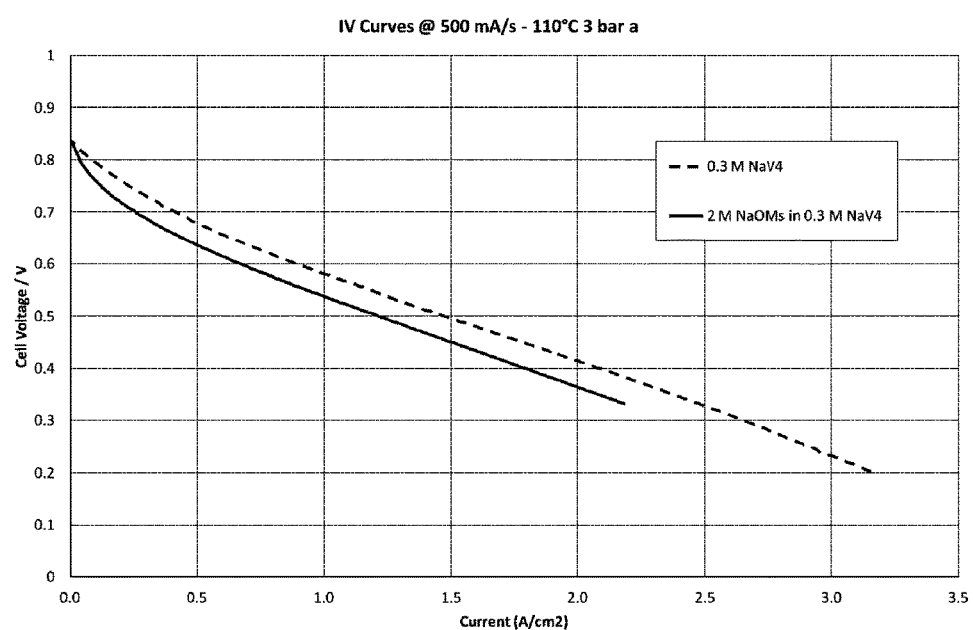
FIG. 6 shows an IV curve comparing a polyoxometalate system with and without an additive of the present invention.
Figure 7:
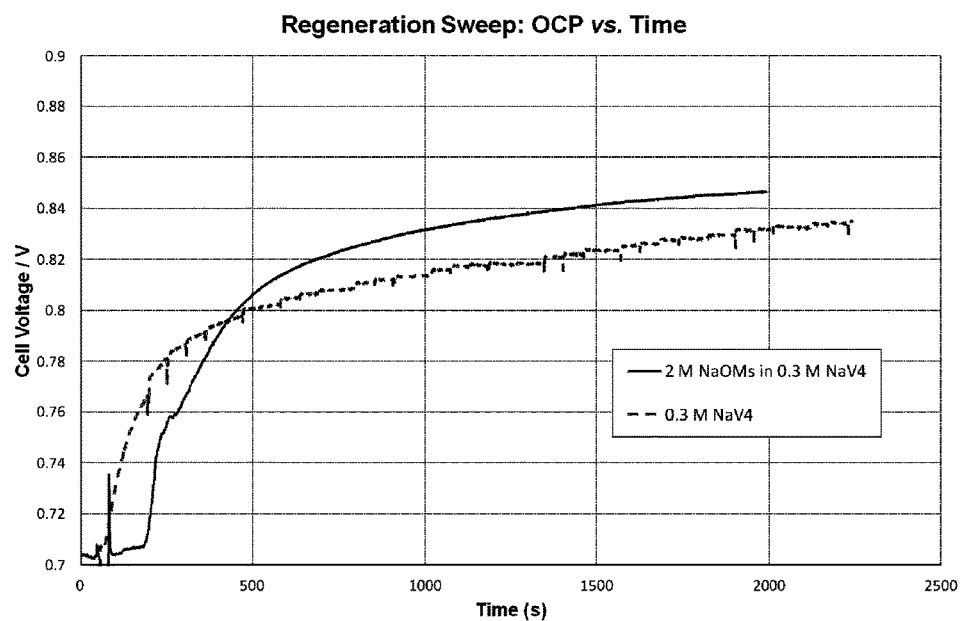
FIG. 7 shows the effect of sparged air in regenerating (i.e. oxidizing after reduction) a polyoxometalate system with and without an additive of the present invention.

The fuel cell performance, at 110° C. and 3 bar absolute pressure, of antifreeze catholytes was evaluated and the results are presented in FIGS. 5, 6 and 7. FIG. 5 shows a comparison between an antifreeze catholyte in a fuel cell operating at a constant current density of 1.5 A cm$^{-2}$ and an untreated catholyte under similar conditions. Periodically, the load was switched off and the cell was allowed to reach open circuit potential for 30 seconds in order to monitor the redox state of the catholyte. FIG. 5 shows that the antifreeze catholyte sustains the current throughout the duration of the test and the open circuit potential is unchanged. This indicates that the regeneration of reduced species is in equilibrium with the electrochemical reduction.

FIG. 6 shows a comparison between the polarisation curves, recorded at a sweep rate of 500 mA sec$^{-1}$, between a catholyte with added antifreeze additive and an untreated catholyte. After an initial drop, the antifreeze catholyte shows a polarisation curve with very similar gradient to that of the untreated catholyte.

FIG. 7 shows the effect on the open circuit potential of the catholyte of sparging air through a reduced solution. The antifreeze catholyte regenerates at a comparable rate to the untreated catholyte and after 30 minutes has reached a higher open circuit potential than the untreated version.

What is claimed is:

1. A catholyte comprising a composition, the composition comprising a polyoxometalate and an additive tolerant to the properties of the polyoxometalate, the properties of the polyoxometalate being maintained despite the presence of the additive, the composition being in the form of an aqueous solution, wherein the additive is, or comprises, one or more acid, or salt or derivative thereof, wherein the acid is a carboxylic acid or a sulphonic acid, and wherein the additive is effective to reduce the freezing point and/or elevate the boiling point of the composition.

2. The catholyte of claim 1, wherein the additive is present in an amount effective to reduce the freezing point and/or elevate the boiling point of the composition.

3. The catholyte of claim 2, wherein the additive is present in an amount effective to reduce the freezing point and/or elevate the boiling point of the composition by at least about 1° C. compared to the freezing point or boiling point of the composition in the absence of the additive.

4. The catholyte as claimed in claim 1, wherein the polyoxometalate is a redox-active polyoxometalate, the additive is tolerant to the oxidizing and/or reducing character of the polyoxometalate, and the redox activity of the polyoxometalate is maintained despite the presence of the additive.

5. The catholyte as claimed in claim 1, wherein the composition has catalytic activity despite the presence of the additive.

6. The catholyte as claimed in claim 1 wherein the additive is tolerant of the acidity of the composition.

7. The catholyte as claimed in claim 6 wherein the composition has a pH of 3 or less.

8. The catholyte as claimed in claim 1 wherein the additive is effective to reduce the freezing point, at standard pressure, of the composition by 20° C. or more.

9. The catholyte as claimed in claim 1 where the polyoxometalate is based on the Keggin structure.

10. The catholyte as claimed in claim 1 wherein the polyoxometalate is of the formula:

$$X_a[Z_bM_cO_d]$$

wherein:

X is selected from hydrogen, alkali metals, alkaline earth metals, ammonium or alkyl ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M is a metal selected from Mo, W, V, Nb, Ta, Mn, Fe, Co, Cr, Ni, Zn Rh, Ru, Tl, Al, Ga, In and other metals selected from the 1st, 2nd and 3rd transition metal series and the lanthanide series, and combinations of two or more thereof;

a is a number of X necessary to charge balance the $[M_cO_d]$ anion;

b is from 0 to 20;

c is from 1 to 40; and d is from 1 to 180.

11. The catholyte as claimed in claim 1 wherein the counterions of the polyoxometalate comprise at least one divalent ion.

12. The catholyte as claimed in claim 11 wherein the polyoxometalate and associated counterion are represented by the formula:

$$X_a[Z_bM_cO_d]$$

wherein:

X is selected from hydrogen, alkali metals, alkaline earth metals, ammonium, transition metal ions and combinations of two or more thereof, but wherein at least one X is a divalent ion;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M is a metal selected from Mo, W, V, Nb, Ta, Mn, Fe, Co, Cr, Ni, Zn Rh, Ru, Tl, Al, Ga, In and other metals selected from the 1st, 2nd and 3rd transition metal series and the lanthanide series, and combinations of two or more thereof;

a is a number of X necessary to charge balance the $[M_cO_d]$ anion;

b is from 0 to 20;

c is from 1 to 40; and d is from 1 to 180.

13. The composition as claimed in claim 1 wherein the polyoxometalate is represented by the formula:

$$X_a[Z_bM_cO_d]$$

wherein:

X is selected from hydrogen, alkali metals, alkaline earth metals, ammonium or alkyl ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M comprises at least one V atom, and M is a metal selected from Mo, W, V, Nb, Ta, Mn, Fe, Co, Cr, Ni, Zn Rh, Ru, Tl, Al, Ga, In and other metals selected from the 1st, 2nd and 3rd transition metal series and the lanthanide series and combinations of two or more thereof;

a is a number of X necessary to charge balance the $[Z_bM_cO_d]$ anion;

b is from 0 to 20;

c is from 1 to 40; and d is from 1 to 180.

14. The composition as claimed in claim 13 further comprising a Vanadium (IV) compound.

15. The catholyte as claimed in claim 1 wherein the polyoxometalate is represented by the formula:

$$X_a[Z_bM_cO_d]$$

wherein:

X is selected from hydrogen, alkali metals, alkaline earth metals, ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M comprises W and optionally one or more of Mo, V, Nb, Ta, Mn, Fe, Co, Cr, Ni, Zn Rh, Ru, Tl, Al, Ga, In and other metals selected from the 1st, 2nd and 3rd transition metal series and the lanthanide series;

a is a number of X necessary to charge balance the $[Z_bM_cO_d]^{a-}$ anion;

b is from 0 to 5;

c is from 5 to 30; and d is from 1 to 180.

16. The catholyte as claimed in claim 1 wherein the additive has a molecular weight of 200 or less.

17. The catholyte as claimed in claim 1 wherein the additive is fully dissociated.

18. The catholyte as claimed in claim 1 wherein the additive is more acidic than the polyoxometalate.

19. The catholyte as claimed in claim 1 in which the acid is a sulphonic acid.

20. The catholyte as claimed in claim 19 in which the sulphonic acid is a halogenated sulphonic acid.

21. The catholyte as claimed in claim 19 in which the sulphonic acid is methanesulphonic acid.

22. A fuel cell comprising the composition of claim 1.

* * * * *